US012647952B2

(12) United States Patent
Heale et al.

(10) Patent No.: US 12,647,952 B2
(45) Date of Patent: Jun. 2, 2026

(54) MANAGING COMMUNICATION IN WIRELESS NETWORKS

(71) Applicant: Analog Devices International Unlimited Company, Limerick (IE)

(72) Inventors: Andrew Heale, Melbourne (AU); Liang Miao, Wantirna South (AU); Ernest Lim, Victoria (AU)

(73) Assignee: Analog Devices International Unlimited Company, Limerick (IE)

( * ) Notice: Subject to any disclaimer, the term of this patent is extended or adjusted under 35 U.S.C. 154(b) by 578 days.

(21) Appl. No.: 18/065,426

(22) Filed: Dec. 13, 2022

(65) Prior Publication Data

US 2024/0155572 A1     May 9, 2024

Related U.S. Application Data

(63) Continuation of application No. PCT/EP2022/080749, filed on Nov. 3, 2022.

(51) Int. Cl.
*H04W 72/0446* (2023.01)

(52) U.S. Cl.
CPC .............................. *H04W 72/0446* (2013.01)

(58) Field of Classification Search
CPC ........... H04W 72/0446; H04W 72/563; H04W 84/18; H04W 72/0453
See application file for complete search history.

(56) References Cited

U.S. PATENT DOCUMENTS

| | | | |
|---|---|---|---|
| 7,379,447 | B2 | 5/2008 | Dunagan et al. |
| 8,290,067 | B2 * | 10/2012 | Cleveland ............. H04L 5/0007 |
| | | | 455/39 |
| 8,559,362 | B2 | 10/2013 | Vujcic et al. |
| 9,219,986 | B2 * | 12/2015 | Pandey ............... H04W 56/001 |
| 9,793,947 | B2 | 10/2017 | Rasband et al. |
| 10,462,808 | B2 | 10/2019 | Aijaz et al. |
| 2006/0209754 | A1 | 9/2006 | Ji et al. |
| 2011/0141981 | A1 * | 6/2011 | Ahmadi ................ H04L 1/0079 |
| | | | 370/329 |

(Continued)

FOREIGN PATENT DOCUMENTS

| | | | | |
|---|---|---|---|---|
| EP | 3501223 B1 * | 6/2022 | ............ | H04W 72/54 |
| WO | 0129984 A1 | 4/2001 | | |

OTHER PUBLICATIONS

International Search Report and Written Opinion issued in International Patent Application No. PCT/EP2022/080749 on Jun. 12, 2023.

*Primary Examiner* — Jay P Patel
(74) *Attorney, Agent, or Firm* — ArentFox Schiff LLP

(57) ABSTRACT
In a channel hopping network, some channels are typically less reliable than others due to interference and multipath effects. It is beneficial to favour the more reliable channels. Examples of the present disclosure achieve this by (1) randomly or pseudorandomly allocating multiple channels to a transmitter-receiver pair; (2) adaptively determining, by the transmitter, relatively reliable channels which the transmitter-receiver pair should ideally use for communication; (3) transmitting this information to the receiver; and (4) comparing the allocated channels with the determined channels to enable both the transmitter and the receiver to select the best channel to communicate on.

20 Claims, 8 Drawing Sheets

(56) References Cited

U.S. PATENT DOCUMENTS

| | | | |
|---|---|---|---|
| 2011/0222506 A1* | 9/2011 | Szymanksi | H04L 1/0042 |
| | | | 370/335 |
| 2013/0013806 A1* | 1/2013 | Woo | H04L 5/06 |
| | | | 709/238 |
| 2014/0281540 A1* | 9/2014 | Brouwer | H04L 9/12 |
| | | | 713/169 |
| 2015/0270869 A1 | 9/2015 | Bivol | |
| 2015/0304814 A1* | 10/2015 | Pandey | H04W 56/001 |
| | | | 455/456.2 |
| 2016/0072548 A1 | 3/2016 | Shih et al. | |
| 2017/0149472 A1* | 5/2017 | Thubert | H04W 72/0453 |
| 2017/0171697 A1* | 6/2017 | Song | H04W 4/80 |
| 2017/0171798 A1* | 6/2017 | Song | H04W 60/00 |
| 2017/0295284 A1* | 10/2017 | Song | H04W 4/80 |
| 2019/0182846 A1 | 6/2019 | Chung et al. | |
| 2021/0311162 A1* | 10/2021 | Mai | G01S 7/415 |
| 2022/0124666 A1* | 4/2022 | Vintola | H04L 27/2602 |
| 2023/0208633 A1* | 6/2023 | Munro | H04L 9/0822 |
| | | | 713/171 |
| 2024/0098719 A1* | 3/2024 | Sienkiewicz | H04W 72/0453 |
| 2024/0155572 A1* | 5/2024 | Heale | H04W 72/0453 |
| 2024/0397262 A1* | 11/2024 | Zheng | H04R 5/04 |

* cited by examiner

MANAGING COMMUNICATION IN WIRELESS NETWORKS

CROSS REFERENCE TO RELATED APPLICATIONS

This application claims the benefit of and priority from International Patent Application No. PCT/EP2022/080749, filed Nov. 3, 2022, titled "MANAGING COMMUNICA-TION IN WIRELESS NETWORKS," the disclosure of which is hereby incorporated by reference herein in its entirety.

FIELD OF THE DISCLOSURE

The present disclosure relates to wireless networks, and more particularly to managing communication between wireless devices in wireless networks.

BACKGROUND

Wireless networks provide communication between nodes without the cost and complexity of routing cables. Wireless networks often have to deal with various forms of interference, resulting in imperfect environments for wire-less communication. This interference can require retrans-mission of wireless data packets, increasing latency within the network.

WO 2020/099437 A2 describes a wireless network including a network manager node that can select both transmission channel frequencies and transmission data rates for each wireless node of the network.

BRIEF DESCRIPTION OF THE DRAWINGS

In the drawings, like reference numerals refer to like parts or components. The drawings illustrate generally, by way of example, but not by way of limitation, various embodiments discussed in the present document.

DETAILED DESCRIPTION

Figure 1A:
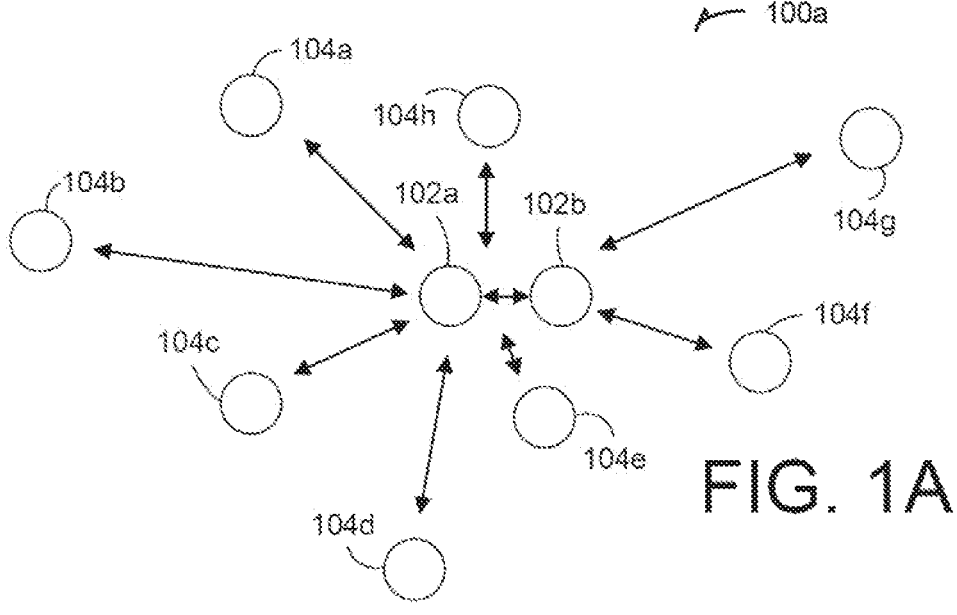
FIG. 1A is a network diagram illustrating an example network according to a star topology.

In accordance with an aspect of the disclosure, there is provided a method of managing communication in a wire-less network having a set of available channels. The method comprises: randomly or pseudorandomly ordering the set of available channels into a first ordered set; generating at least one subset of the set of available channels based on the first ordered set such that the generated subset comprises a first plurality of channels which are present in no other subsets of the set of available channels; and allocating the generated subset for use by at least a first wireless device of the wireless network.

In accordance with another aspect of the disclosure, there is provided a method of managing communication in a wireless network having a set of available channels. The method comprises: generating random or pseudorandom subsets of the set of available channels such that each channel of the set of available channels is present in no more than one of the subsets and at least one of the subsets comprises a first plurality of channels; determining that a channel of the first plurality of channels is present in an allow list; and transmitting or receiving data using the determined channel of the first plurality of channels.

In accordance with another aspect of the disclosure, there is provided a method of managing communication between a first wireless device and a second wireless device. The method comprises: transmitting, by the first wireless device, a plurality of data packets to the second wireless device over a predefined time period, wherein each of the data packets includes data defining an allow list including one or more channels; determining, by the first wireless device, that the predefined time period has elapsed; and in response to determining that the predefined time period has elapsed, communicating, by the first wireless device, with the second wireless device using a channel selected from the one or more channels.

In accordance with another aspect of the present disclo-sure, there is provided a system comprising a plurality of wireless devices. The system is configured to perform the method of any one of the aspects set out above.

In accordance with another aspect of the present disclo-sure, there is provided a system comprising a plurality of wireless devices, the system configured to randomly or pseudorandomly order a set of available channels of a wireless network into a first ordered set; generate at least one subset of the set of available channels based on the first ordered set such that the generated subset comprises a first plurality of channels which are present in no other subsets of the set of available channels; and allocate the generated subset for use by at least a first wireless device of the wireless devices.

In accordance with another aspect of the present disclo-sure, there is provided a system comprising a plurality of wireless devices, the system configured to generate random or pseudorandom subsets of a set of available channels of a wireless network such that each channel of the set of available channels is present in no more than one of the subsets and at least one of the subsets comprises a first plurality of channels; determine that a channel of the first plurality of channels is present in an allow list; and transmit or receive data using the determined channel of the first plurality of channels.

In accordance with another aspect of the present disclo-sure, there is provided a system comprising a first wireless device and a second wireless device, the first wireless device configured to transmit a plurality of data packets to the second wireless device over a predefined time period, wherein each of the data packets includes data defining an allow list including one or more channels; determine that the predefined time period has elapsed; and in response to determining that the predefined time period has elapsed, communicate with the second wireless device using a channel selected from the one or more channels.

In accordance with another aspect of the present disclosure, there is provided a vehicle comprising any one of the systems as set out above.

In a channel hopping network, some channels are typically less reliable than others due to interference and multipath effects. It is beneficial to favour the more reliable channels. Examples of the present disclosure achieve this by (1) randomly or pseudorandomly allocating multiple channels to a transmitter-receiver pair; (2) adaptively determining, by the transmitter, relatively reliable channels which the transmitter-receiver pair should ideally use for communication; (3) transmitting this information to the receiver; and (4) comparing the allocated channels with the determined channels to enable both the transmitter and the receiver to select the best channel to communicate on.

The present disclosure may be associated with one or more of the following advantages: favouring channels that are more reliable; preventing collisions (i.e., when two or more devices on the network transmit on the same channel simultaneously); incurring low overhead in terms of memory use, processing, and communication bandwidth by performing distributed, localized analysis; and allowing for the quality of all channels to be continuously monitored.

The present disclosure operates in a network such as a time slotted channel hopping (TSCH) network with multiple transmitters operating simultaneously, i.e., each transmitter in the network is switching between channels. Some channels are usually more reliable than others. Due to this, transmitter devices according to the present disclosure can analyse the radio environment and make more use of channels that perform better. This results in the network performing better overall. The analysis uses data that is already available locally at each transmitter, and so each transmitter device doesn't require information about what any other device in the network is doing.

The present disclosure involves three main parts, as set out below.

1) A strategy for allocating the available channels to transmitter devices. This may involve providing more channels to the devices most likely to benefit.
2) Selecting from the allocated channels in a way that favours the channels that have performed better up until the present time. For example, if a transmitter is allocated three channels in a given slot, the transmitter and its corresponding receiver would both select the 'best' one of these channels.
3) To do that, all the devices need the same data about which channels are considered 'best'. This is achieved by the transmitter analysing local radio characteristics, and generating a list of preferred channels (described herein as an 'allow list'). The allow list is then sent by the transmitter to the receiver. The allow list may be sent repeatedly to the receiver before the transmitter begins using it.

Figure 1B:
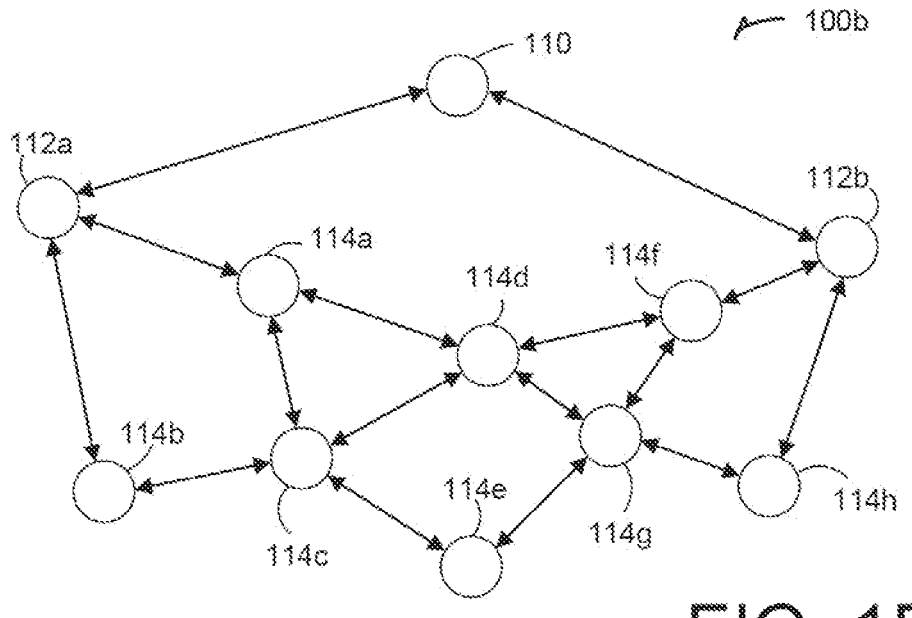
FIG. 1B is a network diagram illustrating an example network according to a mesh topology.

FIG. 1A is a network diagram illustrating an example network 100a configured using a star topology, and FIG. 1B is a network diagram illustrating an example network 100b configured using a mesh topology. Other network topologies than those illustrated in FIGS. 1A and 1B can also be used, such as multi hop topologies, for example. In the example illustrated in FIG. 1A, the network 100a includes two network managers 102a and 102b each configured to communicate with nodes 104a-104h. While illustrated as eight nodes 104a-104h and two network managers 102a and 102b, the network 100a can include any number of network managers connected to communicate with any number of nodes.

In an example, the network 100a can be implemented in a vehicle to monitor the health of a vehicle component(s), such as a battery. In this example, the nodes 104a-104h can be placed throughout the vehicle and configured to sense characteristics of the monitored components. The sensed characteristics can be provided to the network managers 102a and 102b for data collection and reporting. In some examples, the network managers 102a and 102b can provide the data to a central control system (such as an electronic control unit (ECU) or other element in a vehicular electrical system). The central control system can use the data to monitor the health of, and provide control for, the vehicle component(s). In other examples, the network 100a can be implemented in other applications, such as transportation applications involving aircraft, spacecraft, or rail, or in an industrial setting or any other environment.

The network managers 102a and 102b can be connected to each other via a wired or wireless connection and configured to communicate redundantly with the nodes 104a-104h. Additionally, the network managers 102a and 102b can be connected via a wired or wireless connection to a control system through redundant pathways. In one example, the network managers 102a and 102b can be connected to an ECU via an Ethernet connection.

In the example illustrated in FIG. 1B, the wireless network 100b includes an external network controller 110, network managers 112a and 112b, and nodes 114a-114h configured in a mesh topology. While illustrated as eight nodes 114a-114h, two network managers 112a and 112b, and one external network controller 110, the network 100b can be configured to include any number of nodes, network managers, and external network controllers. The network managers 112a and 112b can be connected to the external network controller 110 through either a wireless or wired connection. The external network controller 110 can also be connected to the internet (not shown) via a wired connection, such as an Ethernet connection, for example.

Wireless communication can occur in either direction between the nodes 104a-104h and the network managers 102a and 102b for the wireless network 100a, and can occur in either direction between any of the nodes 114a-114h, and between the nodes 114a-114h and the network managers 112a and 112b for the wireless network 100b. In each wireless communication, one device acts as the transmitter and the other device acts as the receiver. Generally, the apparatus and techniques described herein facilitate coexistence between nodes (such as nodes 104a-104h in FIG. 1A or nodes 114a-114h in FIG. 1B) in an environment where contemporaneous communication is occurring involving multiple nodes and external radio interference may be present, such as an electrically noisy environment in a vehicular or industrial application.

Figure 2:
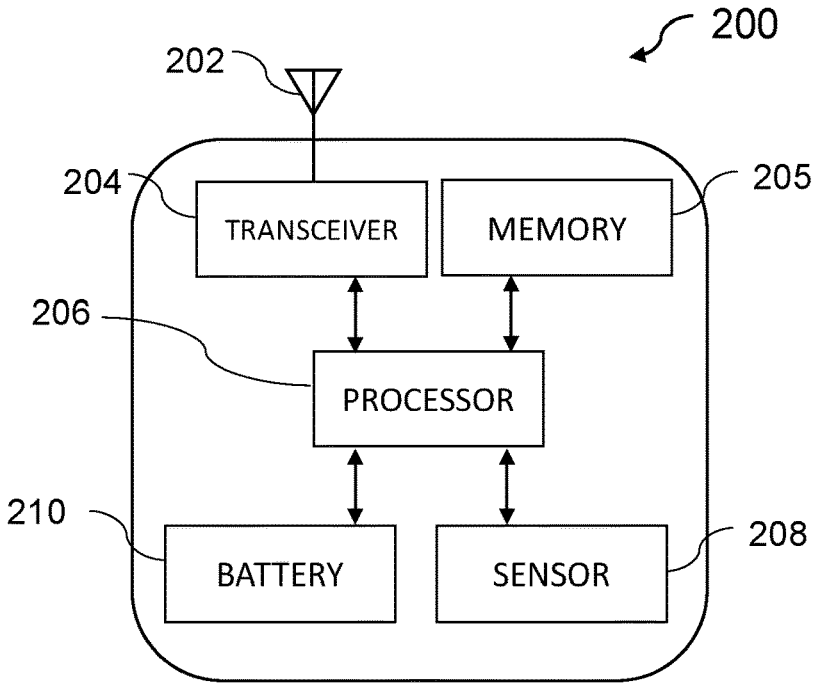
FIG. 2 is a block diagram illustrating a first example wireless device of a wireless network.

FIG. 2 is a block diagram illustrating an example wireless device 200 of a wireless network. The wireless network has a set of available channels that may be used by devices in the wireless network. The set of available channels can be specified by a list of indices, for example between 0 and 15 inclusive. The wireless device 200 can be implemented as any one of the network managers 102a, 102b or nodes 104a-104h shown in FIG. 1A, the network managers 112a, 112b or nodes 114a-114h illustrated in FIG. 1B, or any other wireless node configured to transmit communication to, and receive communication from, another wireless node.

In the example illustrated in FIG. 2, the wireless device 200 includes an antenna 202, a transceiver 204, a memory 205, a processor 206, a sensor 208, and a battery 210. In other examples, the wireless device 200 can include other circuit elements in addition to, or in place of, the components illustrated in FIG. 2. In an example, the transceiver 204 can be a narrowband transceiver. In another example, the transceiver 204 can be a wideband transceiver that is agile across an entire frequency range over which the nodes will be communicating. Although only one transceiver is shown in FIG. 2, multiple transceivers may be used in some examples.

In other examples, the wireless device 200 can include other circuit elements in addition to, or in place of, the components illustrated in FIG. 2. In an example, the antenna 202 and the transceiver 204 may be configured to transmit and receive communication using radio frequency (RF) energy. The battery 210 can be a local battery, or any other energy memory device such as a capacitor or energy harvester. In some examples, the wireless device 200 may not be powered by local energy storage and may be powered using a wired power connection.

The memory 205 of the wireless device 200 can include one or more volatile or non-volatile memories. For example, the memory 205 can include one or more non-volatile memories including read-only memories (ROMs), flash memories, solid state drives, or any other non-volatile memory, and one or more volatile memories including, for example, static or dynamic random-access memories (RAM).

The processor 206 of the wireless device 200 can include one or more application-specific or general-purpose processor circuits. Such circuits can include system-on-chip (SoC) realization or such circuits can be field-programmable. Although only one processor is shown in FIG. 2, multiple processors may be used in some examples. As an illustrative example, two processors may be used, one being a field programmable gate array (FPGA) and the other being a digital signal processor (DSP). The FPGA can be connected to control communication using the transceiver 204, for example, and the DSP can be used for real-time processing such as downsampling, upsampling, coding, or decoding. In other examples, the one or more processors 206 can include any number of controllers including FPGAs, DSPs, microprocessors, application specific integrated circuits (ASICs) or other digital logic circuits.

Figure 3:
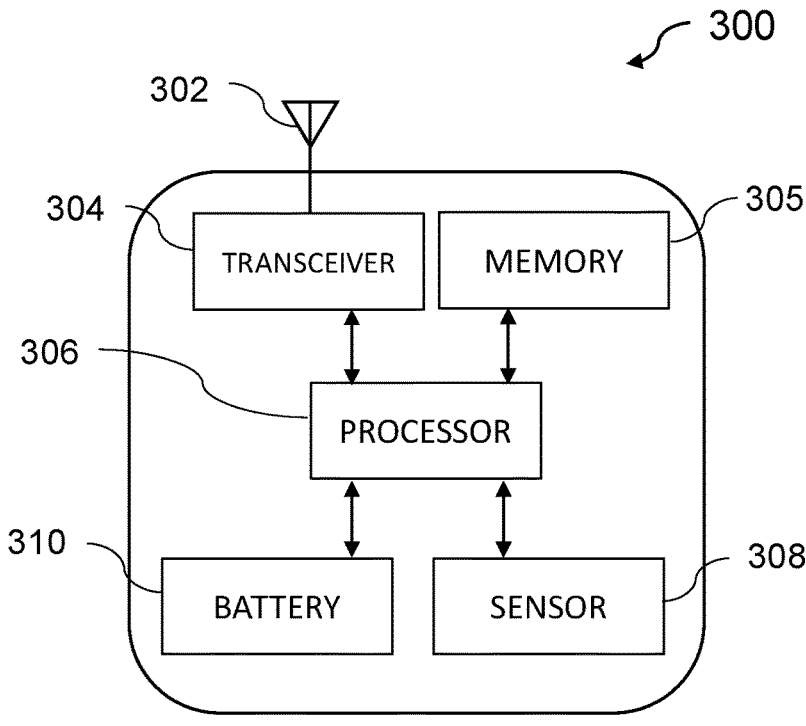
FIG. 3 is a block diagram illustrating a second example wireless device of a wireless network.

The wireless device 200 (also referred to as a first wireless device) is configured to communicate with a second wireless device in the wireless network. An example of a second wireless device 300 is shown in FIG. 3. As shown in FIG. 3, the second wireless device 300 may have substantially the same components as the first wireless device 200. The first wireless device 200 and the second wireless device 300 may form a device pair, in which the first wireless device 200 acts as a transmitter and the second wireless device 300 acts as a receiver. In the present example, the memory 205 of the first wireless device 200 is configured to store an allow list including one or more channels from the set of available channels. The first wireless device 200 may transmit the allow list to the second wireless device 300 so that both the first wireless device 200 and the second wireless device 300 have the same allow list.

The processor 206 is configured to generate a subset of the set of channels available to the wireless network. The processor 206 generates the subset using a pseudorandom (i.e., deterministic) process that is replicated on all other wireless devices of the network (including the second wireless device 300), using only data that is available locally. This means that all the wireless devices of the network can generate subsets at the same time, without the need to transmit any data or the need for a central network manager device. Similarly, each wireless device determines which of the subsets it is to use, also without the need to transmit any data. Each of the subsets includes one or more channels. Further, the subsets are generated in such a way that each channel of the set of available channels is present in no more than one of the subsets. This avoids channel collisions between different wireless devices in the same slot.

In the present example, the processor 206 is configured to pseudorandomise a first permutation of the set of available channels to generate a second permutation of the set of available channels based on a network time associated with the wireless network, which is expressed as an absolute sequence number (ASN). This ensures that the second permutation will be unique to a specific time. The processor 206 pseudorandomises the first permutation using a first random seed value based on the ASN at a given time. The processor 206 can use the first random seed value to initialise a linear congruential pseudo-random generator. The processor 260 then obtains a list of the available channels and shuffles the list using a process such as the Fisher-Yates shuffle process, obtaining the required pseudorandom values from the pseudo-random generator. This shuffling process generates the second permutation.

In addition, the processor 206 may be configured to pseudorandomise the first permutation of the available channels based on a unique network identification (ID) associated with the wireless network. The network ID may provide a second random seed value which is unique to the wireless network, and can be used as input for the linear congruential pseudo-random generator in conjunction with the first random seed value described above. Performing the pseudorandomisation process based on the network ID ensures, with high probability, that the generated second permutation of channels is specific to the wireless network and is different from permutations which may be obtained for other wireless networks. Hence, performing the pseudorandomisation process based on the network ID reduces the possibility of interference with other networks. Furthermore, even if two separate networks did happen to produce the same permutation at the same time, using the network IDs in the pseudorandomisation process ensures that the permutations of the two networks would not be the same after the next pseudorandomisation process.

Figure 4:
FIG. 4 is a chart illustrating an example randomization period of a wireless network.

The processor 206 may be configured to periodically perform the randomisation process each time a predefined randomisation period elapses. The length of the randomisation period is selected to balance the requirements of computational complexity and avoiding the reuse of channels during retries, against the randomness of the selected channel. In some examples, the length of the randomisation period is greater than the length of a time slot of the wireless network. This reduces the load on the processor 206 and helps to avoid using the same channel twice in succession. Specifically, this is desirable when a failed transmission is being retried, because a retry on a different channel is more likely to succeed. However, avoiding the previous channel is less likely after the channels have been randomised. In the present example, the processor 206 performs the randomisation process at the beginning of every slotframe. In other words, the randomisation period has the same length as the length of a slotframe (e.g., 200 ms). This is illustrated in FIG. 4. The start time of each slotframe (and hence, in this example, the start time of each randomisation process) is based on the network time of the wireless network expressed as an ASN.

In the present example, the processor 206 is further configured to move channels before a particular split point in the second permutation of available channels to the end of the second permutation, creating a new third permutation. The processor 206 performs this operation at the beginning of each time slot. This allows the wireless device 200 to use different parts of the randomised second permutation for different slots. In the present example, the wireless device 200 generates a subset for each slot based on the third permutation.

The split-and-move operation also plays a role in managing retries. When a data transmission fails, it may be attempted again. The split point can be chosen so that a different channel is chosen for this retry, which is beneficial because the original channel is relatively likely to fail again. The split point in the second permutation may be determined using the equation s=i mod n, where i is the slot number within the slotframe and n is the number of channels available to the network. For example, if there are 13 channels, then in slot 30 of the slotframe, the split point would be after the fourth channel in the second permutation, because 30 mod 13=4. However, if each wireless device in the wireless network happens to be allowed to transmit every n slots, this equation will choose the same split point repeatedly, causing retries to use the same channel. In this example, it would retry in slot 30+13=43, and split at position 43 mod 13=4. In such cases, an alternative equation such as s=(i+i/n) mod n may be used.

Figure 5:
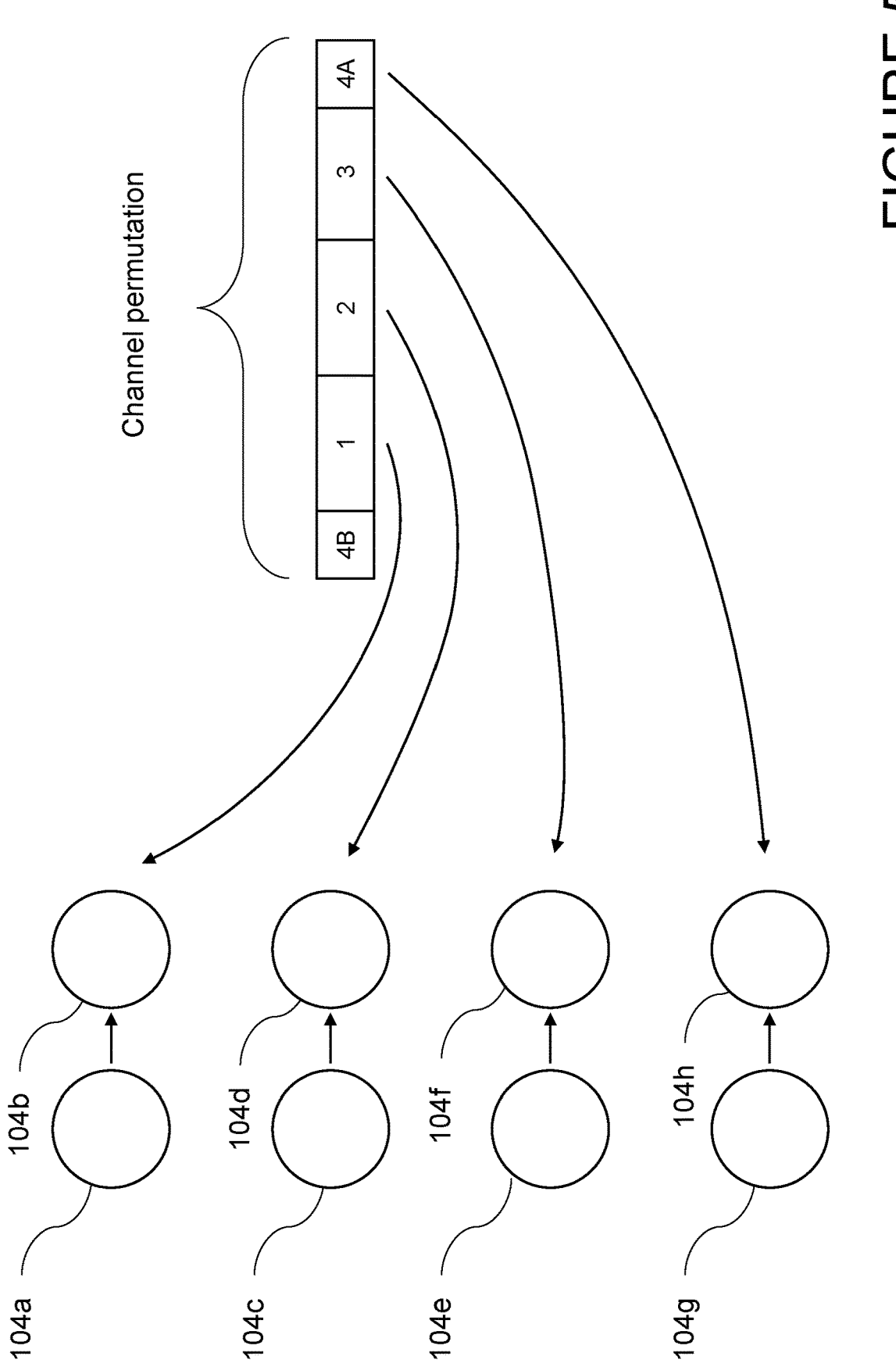
FIG. 5 is a schematic diagram illustrating an example of allocating channel subsets to respective wireless devices.

An example of a channel allocation process is illustrated in FIG. 5, which shows a channel permutation divided into four subsets 1, 2, 3 and 4, which are respectively allocated to four wireless device pairs 104a-104b, 104c-104d, 104e-104f, 104g-104h. In this example, the wireless devices 104a, 104c, 104e 104h act as transmitters and the wireless devices 104b, 104d, 104f, 104h act as receivers.

The subsets, or channel allocations, are ordered portions of a permutation of the available channels. For a given permutation, each channel allocation may be specified by a starting index and a length, so that it contains the channel denoted by the starting index and all subsequent channels for the specified length. Where this extends beyond the last channel of the permutation, counting recommences at the first channel of the permutation in a cyclical fashion.

Thus, for a channel permutation P having channels c given by:

$$P=[c0,c1, \ldots ,cn-1],$$

the corresponding channel allocations are:

$$A0=[cs,cs+1, \ldots ,cs+n0-1],$$

$$A1=[cs+n0, \ldots ,cs+n0+n1-1],$$

$$Am=[cs+n0+n1+ \ldots +nm-1, \ldots ,cs+n0+n1+ \ldots +nm-1]$$

where: ck=ck–n for k>n and n=the number of available channels
and n0+n1+ . . . +nm=n
which defines m+1 channel allocations A0, A1, . . . , Am.

In the present disclosure, the channel allocations are disjoint, i.e., two different channel allocations do not have any channels in common. In other words, each channel of the set of available channels is present in no more than one of the channel allocations.

Each wireless device in the wireless network can store a starting index value to be used for each slot, or alternatively can compute a starting index value for each slot. In the present example, each wireless device in the wireless network, including the first wireless device 200, stores first and second lookup tables in memory. The first lookup table contains the start index values for multiple (in the present case, six) subsets, which may be used simultaneously in a single slot. The second lookup table defines which of the subsets a given wireless device uses in each slot. In other examples, the second lookup table may define different subsets for each wireless device to use in each slot.

In the present example, the processor 206 computes an index for each slot based on the current ASN, looks up that index in the second lookup table, and uses the result to look up the starting index in the first lookup table. In the present example, the starting index value determined by consulting the first lookup table is modified by the split-and-move operation described above, and the wireless device 200 allocates itself a subset starting with the modified index value. As mentioned above, this ensures that the starting index should not be the same for two consecutive slots.

The number of channels allocated to a given device is determined by length of the channel allocation for the device. Each wireless device may store a length value in memory. For example, the first lookup table described above may contain start index values and length values for each of the subsets. Wireless devices that are expected to send more urgent data, or to send data over a greater distance, can be assigned a greater number of channels. Wireless devices which are less critical can be assigned only one channel. In the present case, the channel allocation assigned to the wireless device 200 includes multiple channels, so that the processor 206 generates a subset including multiple channels. This means that the wireless device 200 has a better chance of being able to select a channel which is in the allow list stored in the memory 205. This leads to transmissions from the wireless device 200 having a higher reliability and lower latency.

In the present example, the processor 206 is configured to scan the generated subset of channels and determine whether one of the channels in the subset is also present in the allow list stored in the memory 205. In the present example, the processor 206 is configured to select the first channel of the channels in the subset that is also in the allow list. The first wireless device 200 can then communicate with the second wireless device 300 via the transceiver 204, using the selected channel. The second wireless device 300 will also compute the same subset of channels and will carry out corresponding processes in relation to its allow list which is stored in the memory 305. This means that the second wireless device 300 will use the same channel as the first wireless device 200.

If the processor 206 determines that no channel in the subset of channels is present in the allow list, it selects the last channel in the subset (even though this channel is not in the allow list) and uses this channel for communication with the second wireless device 300. Again, the second wireless device 300 will also select the same channel and use this channel for communication.

In other examples, the processor 206 always selects the first channel in the subset of available channels, without considering the allow list. In such examples, the first wireless device 200 may be referred to as a "test cell". The number of wireless devices which act as test cells over a given slotframe may be from 0 to 10%. In some examples, the number of wireless devices which act as test cells over a given slotframe may be 5%.

Selecting the first channel without considering the allow list means that channels which are not present in the allow list can be used and observed for reliability, and potentially added to the allow list. Also, there may be times during operation of the wireless network when the second wireless device 300 does not have the same allow list as the first wireless device 200. This means that the first wireless device 200 and the second wireless device 300 may fail to use the same channel as each other, in which case communication between the wireless devices will fail.

These test cells, in which both devices select the first channel in the subset, allow communication to succeed anyway. This enables receivers to obtain the next allow list even if they don't have the current allow list, and thereby resynchronise their allow lists. Furthermore, because all wireless devices in the wireless network also know when the test cells occur, this allows them to 'listen' and evaluate the link quality between themselves and the transmitter for network monitoring purposes.

'Listening' is a method that allows other devices (e.g., a third wireless device) on the network to assess the channel quality between themselves and the first wireless device 200 (which is, or may be, transmitting data to the second wireless device 300). To listen, the third wireless device selects the same channel as the first wireless device 200 and attempts to receive its transmission and also measure the RSSI or other link quality metrics described herein. This can be used for network monitoring purposes. The data received is not relevant to the listener and can be discarded. However, for a node to listen, it must select the same channel as the transmitter. Listening during test cells is advantageous as it means the correct channel can be selected without knowing the transmitter's allow list. It is impossible to listen during normal cells because the third wireless device does not typically know the transmitter's allow list, and therefore cannot choose the correct channel.

In an example, the wireless device 200 can use the transceiver 204 to monitor and collect data regarding the RF environment of the network, as well as collect information regarding transmitted and received communications. The collected data can be used to form or adjust one or more models of the environment. The models can be stored as an analytical representation using one or more data structures implemented in the memory 205. The models can be used to monitor link quality, including the ACK-ratio (proportion of packets sent for which an ACK is received), relative received signal strength (RSSI) and the signal-to-noise ratio (SNR), packet error rates, a health of each node, time stamping, packet travel distance, collision detection, and RF interference within the environment. RF interference in the 2.4 GHz band, for example, can result from Wi-Fi, ZigBee, Bluetooth, and other co-existing protocols. Additionally, networks implemented in highly metallic environments can experience severe attenuation on some channels, while other channels can remain relatively unaffected.

The generation of the allow list by the processor 206 will now be described in detail. The processor 206 is configured to determine quality indicators for a given channel based on measurements of one or more of: the number of acknowledgements from a receiving device (e.g., the second wireless device); RSSIs of the acknowledgements; background noise measurements; and any other link quality metrics described herein. The processor 206 may be configured to process the measurements using an exponential smoothing filter, which may operate block-wise, configured so the newest data-point or points dominate the output. This makes the processing responsive to gross changes in the radio environment of the wireless device 200, yet also allows it to sense small imperfections (which may not be reliably detected in the short observation period). The processor 206 may also be configured to periodically listen to communications of other wireless devices in order to gather reliability data for other purposes. However, there is no explicit sharing of measurements with other wireless devices.

The processor 206 ranks the channels in order of 'path stability' (in the present example, defined as the percentage of successful transmissions including receipt of an acknowledgement, abbreviated 'PS'), and generates an allow list including channels having path stability above a particular threshold. As an alternative method, the processor 206 ranks the channels in order of path stability and generates a preliminary allow list including the k best channels, and then taking the worst of these as reference, it adds channels that have all three of:

PS of channel>PS of reference−PS threshold, and

RSSI of channel>RSSI of reference−RSSI threshold, and

Signal to interference ratio (SIR) of channel>SIR of reference−SIR threshold, to produce the final allow list.

The processor 206 can store the allow list in the memory 205. In the present example, the allow list defines a "preferred/not preferred" state for each channel. This can be expressed as an array of bits. In other examples, the allow list may define a scalar 'weight' denoting much each channel is preferred, rather than a binary "preferred/not preferred" state. Defining a weight for each channel allows finer control over channel selection but requires higher bandwidth, memory and processing cycles.

The allow list preferably always excludes some portion of the channels, as this typically improves network performance at the onset of external interference. In some examples, the threshold for inclusion in the allow list becomes higher as more channels are added to the list, as each additional channel is of less benefit in the subsequent processing steps.

Operations for management of the allow list may occur periodically with a predefined time period, termed the adaptation period, and may be synchronized to the ASN. The length of the adaptation period should be selected to balance short-term and long-term requirements. It should be short enough to enable allow lists to adapt to short term changes in the radio environment, but should also be long enough so that a sufficient number of sample data points for the channels of a device pair can be collated for the purpose of allow list adaptation. The adaptation period is typically two or three orders of magnitude longer than a slot. For example, the length of the adaptation period may be 250 to 5000 times the length of a slot. In the present example, the adaptation period is four seconds.

During the adaptation period, the processor 206 may perform the following actions:

transmit data to the second wireless device 300 using a channel from an allow list (or in some examples, using a channel that is not in an allow list), transmit an allow list to the second wireless device 300, and collect data to generate an allow list.

The above actions may all occur concurrently, so that in given adaptation period the processor 206 may:

transmit data to the second wireless device 300 using a channel from an allow list k, transmit an allow list k+1 to the second wireless device 300, and collect data to generate an allow list k+2.

In this case, the first wireless device 200 gathers radio data via the transceiver 204 and uses this data to generate the future allow list k+2. At the same time, the wireless device 200 transmits data packets including the next allow list k+1 to the second wireless device 300. These data packets may include data from the sensor 208 of the first wireless device 200. The length of the adaptation period is set so that a minimum number of data packet transmissions (e.g., 5 to 15 data packet transmissions) occurs before the next allow list is adopted, giving high reliability. As an example, 10 data packet transmissions to each receiver would typically be adequate. Once the present adaptation period has elapsed, the first wireless device 200 can begin using a channel from the allow list k+1 to communicate with the second wireless device 300.

In some examples, an activation delay period may be defined which is shorter than the adaptation period, and the first wireless device 200 can begin using a channel from the allow list k+1 to communicate with the second wireless device 300 once the activation delay period has elapsed. Using an activation delay period which is shorter than the adaptation period helps to spread computational operations across different times (i.e., some computational operations occur at the end of the activation delay period while some computational operations occur at the end of the adaptation period), which reduces the computational burden on the processor 206 at the end of the adaptation period.

The present allow list k and next allow list k+1 may both be stored in the memory 205 of the wireless device 200, so that the processor 206 is able to access the allow list for any near-future ASN. Furthermore, the processor 206 can 'look ahead' to tune the transceiver 204 in advance, because it knows based on the target ASN whether to use the current or the next allow list, yet can back-track to the current allow list if a more urgent request pre-empts it. In one example, as soon as one packet has been sent (or received), the processor 206 programs the transceiver 204 in preparation for sending or receiving the next expected packet. This may be many slots in the future, such as if there is no data currently waiting to send. Because channel selection depends on the ASN, allow list, and channel allocation that will be in effect when the packet is finally transmitted, this requires the processor 206 to 'look ahead' at future values of the ASN, allow list and channel allocation to determine which channel to select. It may be that the processor 206 needs to use allow list k+1 for this calculation. Subsequently, a more urgent data packet may arise, such as if a new measurement is made by the sensor 208; the transmission of this data packet would occur earlier (with lower ASN) and use a different channel than that which was prepared. In this case, the preparation performed on the transceiver 204 may be abandoned, and new preparation may be performed—which must be based on the values of the ASN, allow list and channel allocation at the time that this earlier packet will be transmitted. It may be that the processor 206 now needs to 'back-track' and use allow list k. As such, after the processor 206 has looked ahead to prepare, it may now back-track, to a time that is less far in the future. For this reason, allow list k is not discarded simply because the processor 206 has started to use allow list k+1.

The processor 306 of the second wireless device 300 is configured to extract the next allow list k+1 from a received data packet, and can store the allow list in the memory 305 for use in the channel selection process. If the received allow list is not next, but second to next (which can happen due to CPU scheduling latency), then it can be discarded with minimal loss of reliability.

Figure 6:
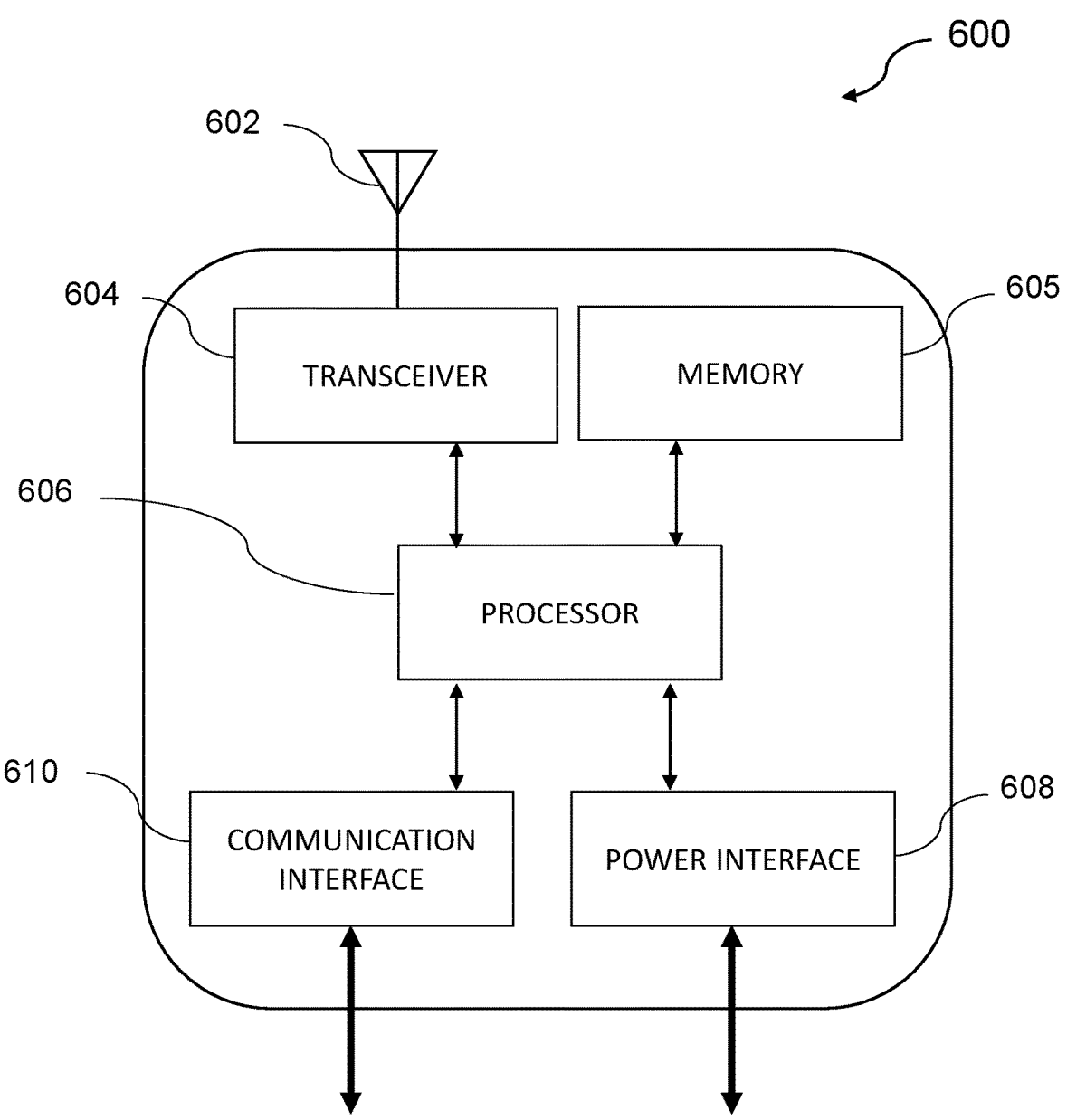
FIG. 6 is a block diagram illustrating an example manager device of a wireless network.

FIG. 6 is a block diagram illustrating an example network manager device 600 of a wireless network having a set of available channels that may be used by devices in the wireless network. The network manager device 600 can be any of manager devices 102*a*, 102*b* of FIG. 1A, 112*a*, 112*b* of FIG. 1B, or any other node in any other wireless network. In the example illustrated in FIG. 6, the network manager device 600 includes an antenna 602, a transceiver 604, a memory 605, a processor 606, a power interface 608, and a communication interface 610.

The power interface 608 can be configured to connect through a wired connection to receive power. For example, if the wireless network is implemented in a vehicle, the power interface 608 can be connected to receive power from a vehicle power bus, such as a direct current (DC) bus and condition the power for use by the processor 606. In some examples, the network manager device 600 can also include a backup power source such as a battery, capacitor, or energy harvester circuit. In some examples, the network manager device 600 may not be powered using a wired power connection and may be powered only using a local power source such as a battery or energy harvester.

The communication interface 610 can be configured for wired communication with one or more of another network manager device and a backend system. For example, a vehicle can include an engine control module (ECM) configured to monitor many aspects of vehicle operation. The network can be configured to provide sensed data to the ECM for one or more monitored aspects of vehicle operation. In some examples, the network manager device 600 can be integrated into the ECM or other backend system. The wired communication can be Ethernet, Controller Area Network (CAN), or any other wired protocol.

In other examples, the network manager device 600 can include other circuit elements in addition to, or in place of, the components illustrated in FIG. 6. In an example, the antenna 602 and the transceiver 604 may be configured to transmit and receive communication using RF energy.

In the present example, the processor 606 of the network manager device 600 is configured to periodically generate a random permutation of the set of available channels (for example, at the beginning of each slotframe), and transmit this permutation to wireless devices in the wireless network via the transceiver 604. Each of the wireless devices can use the received random permutation to generate one or more subsets of the available channels in a similar manner to that described above in relation to FIG. 2.

Figure 7:
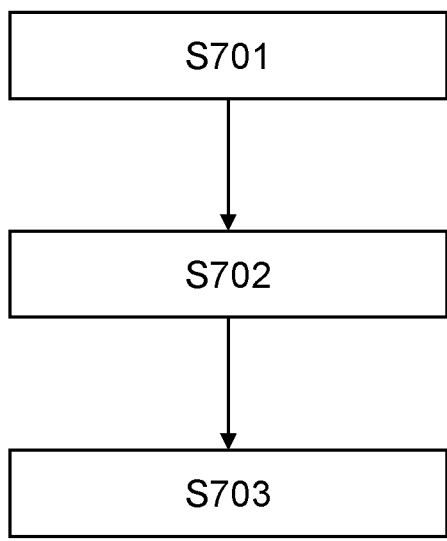
FIG. 7 is a flowchart illustrating an example method of managing communication in a wireless network having a set of available channels.

FIG. 7 shows an example of a method of managing communication in a wireless network having a set of available channels. The method may be performed by one or more of the devices described herein, such as first wireless device as described above in relation to FIG. 2 and the manager device described above in relation to FIG. 6.

The method shown in FIG. 7 includes randomly or pseudorandomly ordering the available channels into a first ordered set (S701). The method further includes generating at least one subset of the set of available channels based on the first ordered set. The subset is generated in such a manner that it includes multiple channels which are present only in the generated subset and no other subsets (S702). The method further includes allocating the generated subset for use by at least a first wireless device of the wireless network (S703).

Figure 8:
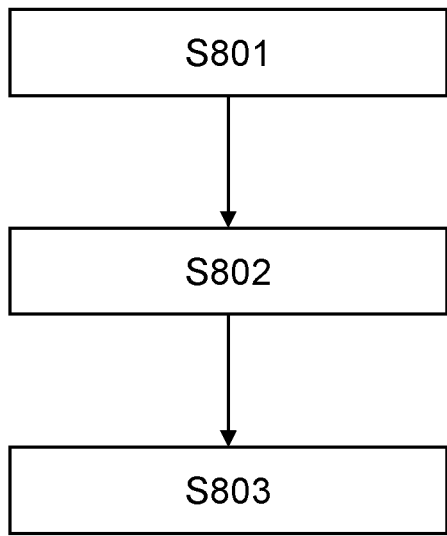
FIG. 8 is a flowchart illustrating an example method of managing communication in a wireless network having a set of available channels.

FIG. 8 shows an example of a method of managing communication in a wireless network having a set of available channels. The method may be performed by any of the wireless networks described herein, such as a wireless network including a first wireless device as described above in relation to FIG. 2, a second wireless device as described above in relation to FIG. 3, and a network manager device as described above in relation to FIG. 6. In an example, the wireless network can be implemented in a vehicle, and wireless devices of the wireless network may be distributed throughout the vehicle.

The method shown in FIG. 8 includes generating random or pseudorandom subsets of the set of available channels (S801). The subsets are generated in such a way that each channel of the set of available channels is present in no more than one of the subsets, and at least one of the subsets comprises multiple channels. The method further comprises determining that a channel of the multiple channels is present in an allow list (S802); and transmitting or receiving data using the determined channel of the first plurality of channels (S803).

Figure 9:
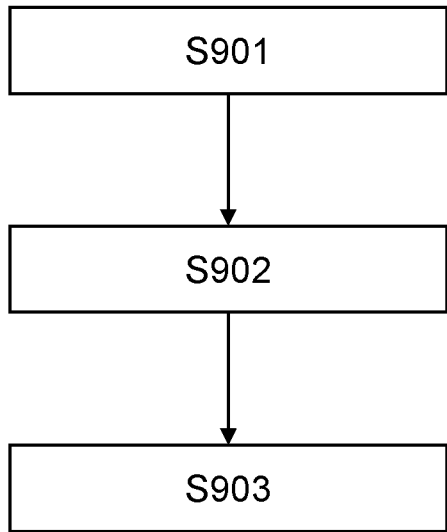
FIG. 9 is a flowchart illustrating an example method of managing communication between a first wireless device and a second wireless device.

FIG. 9 shows an example of a method of managing communication between a first wireless device and a second wireless device. The first wireless device may be a wireless device as described above in relation to FIG. 2, and the second wireless device may be a wireless device as described above in relation to FIG. 3.

The method includes transmitting, by the first wireless device, a plurality of data packets over a predefined activation delay period (S901). Each of the plurality of data packets includes data defining an allow list including one or more channels. In some examples, each of the data packets further includes data generated by a sensor of the first wireless device.

The method further includes determining, by the first wireless device, that the activation delay period has elapsed (S902). The method further includes, in response to determining that the activation delay period has elapsed, communicating, by the first wireless device, with the second wireless device using a channel selected from the one or more channels (S903). In other words, the first wireless device begins communication with the second wireless device regardless of whether it has received an acknowledgement of the data packets from the second wireless device. This method is low bandwidth, time-bounded, and minimizes the risk of failure.

The activation delay period may be the same length as the adaptation period described above. In some examples, the activation delay period may be shorter than the adaptation period. Using a relatively short activation delay period allows the wireless network to respond to changes in the network environment more quickly. However, the activation delay period should be long enough so that a suitable number of data packets can be transmitted during the activation delay period. For example, the activation delay period may be long enough to include 5 to 15 data packet transmissions, e.g., 10 data packet transmissions. If the first wireless device and the second wireless device have n active time slots in an activation delay period, where n is much larger than the number of channels in the current allow list, then the chance of at least one data packet being successfully transmitted is approximately given by $1-(1-PSav)n$ where PSav is the average path stability of the channels in the current allow list. Thus, even if the average reliability of the allow list channels is modest, the likelihood of a successful allow list update (i.e., at least one successful data packet transmission in the activation delay period) is very high for a sufficiently long adaptation period.

In some embodiments, one or more memory elements can store data which can be used to implement the methods and/or operations described herein. This includes the memory element(s) being able to store instructions (for example, software, logic, code, etc.) in a non-transitory storage medium such that the instructions can be executed by one or more processors to carry out the methods and/or operations described herein.

The above description includes references to the accompanying drawings, which form a part of the detailed description. The drawings show, by way of illustration, specific embodiments in which the disclosure can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more". In this document, the terms "including" and "in which" are used as the plain-English equivalents of the respective terms "comprising" and "wherein". Also, in the following claims, the terms "including" and "comprising" are open-ended, that is, a system, device, article, composition, formulation, or process that includes elements in addition to those listed after such a term in an aspect are still deemed to fall within the scope of that claim.

The above description is intended to be illustrative, and not restrictive. For example, the above-described examples (or one or more aspects thereof) may be used in combination with each other. Other embodiments can be used, such as by one of ordinary skill in the art upon reviewing the above description. The scope of the disclosure should be determined with reference to the appended claims, along with the full scope of equivalents to which such claims are entitled.

Example combinations of features are set out below.

(A1) In an aspect, there is provided a system comprising a plurality of wireless devices, the system configured to: randomly or pseudorandomly order a set of available channels of a wireless network into a first ordered set; generate at least one subset of the set of available channels based on the first ordered set such that the generated subset comprises a first plurality of channels which are present in no other subsets of the set of available channels; and allocate the generated subset for use by at least a first wireless device of the wireless devices.

(A2) In an example of (A1), the system is configured to pseudorandomly order the set of available channels by pseudorandomly ordering the set of available channels based on a network time associated with the wireless network.

(A3) In an example of (A1), the system is configured to pseudorandomly order the set of available channels by pseudorandomly ordering the set of available channels based on a unique network identification of the wireless network.

(A4) In an example of (A1), the system is configured to randomly or pseudorandomly order the set of available channels every time a first predefined time period elapses.

(A5) In an example of (A4), the length of the first predefined time period is greater than the length of a time slot of the wireless network. Optionally, the length of the predefined time period is the same as the length of a slotframe of the wireless network.

(A6) In an example of (A1), the system is further configured to:

reorder the first ordered set by moving channels before a first point in the first ordered set to the end of the first ordered set, thereby forming a second ordered set, wherein the system is configured to generate the subset of the set of available channels based on the second ordered set.

(A7) In an example of (A1), the system comprises:
a network manager device; and
the first wireless device,
wherein the network manager device is configured to randomly order the set of available channels into the first ordered set, and to transmit the first ordered set to the first wireless device, and
wherein the first wireless device is configured to generate the at least one subset of the set of available channels and allocate the generated subset for use by the first wireless device.

(A8) In an example of (A1), the plurality of wireless devices are configured to pseudorandomly order the set of available channels into the first ordered set simultaneously, and
the first wireless device is configured to generate the at least one subset of the set of available channels and allocate the generated subset for use by the first wireless device.

(A9) In an example of (A1), the number of channels in the first plurality of channels is determined based on an importance of the first wireless device relative to other wireless devices of the wireless network.

(A10) In an example of (A1), the first wireless device comprises a transceiver and one or more processors configured to:

determine that a channel of the first plurality of channels is present in an allow list stored by the first wireless device; and
transmit data to a second wireless device via the transceiver using the determined channel of the first plurality of channels.

(A11) In an example of (A10), the one or more processors are further configured to:

transmit, via the transceiver, a plurality of data packets to the second wireless device over a second predefined time period, wherein each of the plurality of data packets includes data defining the allow list; and
in response to determining that the second predefined time period has elapsed, transmit, via the transceiver, the data to the second wireless device using the determined channel of the first plurality of channels.

(A12) In an example of (A11), the first wireless device comprises:

one or more sensors configured to generate sensor data, wherein each of the data packets includes said sensor data.

(A13) In an example of (A12), the one or more sensors are vehicle sensors configured to sense attributes of a vehicle such as an automobile in which they are emplaced.

(B1) In an aspect, there is provided a system comprising a plurality of wireless devices, the system configured to:

generate random or pseudorandom subsets of a set of available channels of a wireless network such that each channel of the set of available channels is present in no more than one of the subsets and at least one of the subsets comprises a first plurality of channels;
determine that a channel of the first plurality of channels is present in an allow list; and
transmit or receive data using the determined channel of the first plurality of channels.

(B2) In an example of (B1), the system is configured to randomly or pseudorandomly order the set of available channels every time a first predefined time period elapses.

(B3) In an example of (B2), the length of the first predefined time period is greater than the length of a time slot of the wireless network. Optionally, the length of the predefined time period is the same as the length of a slotframe of the wireless network.

(B4) In an example of (B1), the data includes sensor data.

(C1) In an aspect, there is provided a system comprising a first wireless device and a second wireless device, the first wireless device comprising a transceiver and one or more processors configured to: transmit, via the transceiver, a plurality of data packets to the second wireless device over a predefined time period, wherein each of the data packets includes data defining an allow list including one or more channels; determine that the predefined time period has elapsed; and in response to determining that the predefined time period has elapsed, communicate with the second wireless device via the transceiver using a channel selected from the one or more channels.

(C2) In an example of (C1), the first wireless device comprises:

one or more sensors configured to generate sensor data, wherein each of the data packets includes said sensor data.

(C3) In an example of (C2), the one or more sensors are vehicle sensors configured to sense attributes of a vehicle such as an automobile in which they are emplaced.

(D1) In an aspect, there is provided a method of managing communication in a wireless network having a set of available channels, the method comprising: randomly or pseudorandomly ordering the set of available channels into a first ordered set; generating at least one subset of the set of available channels based on the first ordered set such that the generated subset comprises a first plurality of channels which are present in no other subsets of the set of available channels; and allocating the generated subset for use by at least a first wireless device of the wireless network.

(D2) In an example of (D1), pseudorandomly ordering the set of available channels comprises pseudorandomly ordering the set of available channels based on a network time associated with the wireless network.

(D3) In an example of (D1) or (D2), pseudorandomly ordering the set of available channels comprises pseudorandomly ordering the set of available channels based on a unique network identification of the wireless network.

(D4) In an example of any one of (D1) to (D3), the set of available channels is randomly or pseudorandomly ordered every time a first predefined time period elapses.

(D5) In an example of (D4), the length of the first predefined time period is greater than the length of a time slot of the wireless network. Optionally, the length of the predefined time period is the same as the length of a slotframe of the wireless network.

(D6) In an example of any one of (D1) to (D5), the method further comprises:

reordering the first ordered set by moving channels before a first point in the first ordered set to the end of the first ordered set, thereby forming a second ordered set, wherein generating the subset of the set of available channels comprises generating the subset based on the second ordered set.

(D7) In an example of any one of (D1) to (D6), the step of randomly ordering the available channels into the first ordered set is performed by a network manager device of the wireless network, and the method further comprises transmitting, by the network manager device, the first ordered set to the first wireless device; and wherein the steps of generating the at least one subset of the set of available channels and allocating the generated subset for use by the first wireless device are performed by the first wireless device.

(D8) In an example of any one of (D1) to (D6), the step of pseudorandomly ordering the available channels into the first ordered set is performed simultaneously by each of a plurality of wireless devices of the wireless network, the plurality of wireless devices including the first wireless device, and wherein the steps of generating the at least one subset of the set of available channels and allocating the generated subset for use by the first wireless device are performed by the first wireless device.

(D9) In an example of any one of (D1) to (D8), the number of channels in the first plurality of channels is determined based on an importance of the first wireless device relative to other wireless devices in the wireless network.

(D10) In an example of any one of (D1) to (D9), the method further comprises:

determining, by the first wireless device, that a channel of the first plurality of channels is present in an allow list stored by the first wireless device; and transmitting, by the first wireless device, data to a second wireless device using the determined channel of the first plurality of channels.

(D11) In an example of (D10), the method further comprises:

transmitting, by the first wireless device, a plurality of data packets to the second wireless device over a second predefined time period, wherein each of the plurality of data packets includes data defining the allow list; and in response to determining, by the first wireless device, that the second predefined time period has elapsed, transmitting the data to the second wireless device using the determined channel of the first plurality of channels.

(D12) In an example of (D10) or (D11), the method further comprises:

generating, by one or more sensors of the first wireless device, sensor data, wherein each of the plurality of data packets includes the sensor data.

(E1) In an aspect, there is provided a method of managing communication in a wireless network having a set of available channels, the method comprising:

generating random or pseudorandom subsets of the set of available channels such that each channel of the set of available channels is present in no more than one of the subsets and at least one of the subsets comprises a first plurality of channels;

determining that a channel of the first plurality of channels is present in an allow list; and transmitting or receiving data using the determined channel of the first plurality of channels.

(F1) In an aspect, there is provided a method of managing communication between a first wireless device and a second wireless device, the method comprising:

transmitting, by the first wireless device, a plurality of data packets to the second wireless device over a predefined time period, wherein each of the data packets includes data defining an allow list including one or more channels;

determining, by the first wireless device, that the predefined time period has elapsed; and in response to determining that the predefined time period has elapsed, communicating, by the first wireless device, with the second wireless device using a channel selected from the one or more channels.

(F2) In an example of (F1), each of the data packets includes data generated by a sensor of the first wireless device.

(G1) In an aspect, there is provided a system comprising a plurality of wireless devices, the system being configured to perform the method of any one of the preceding examples.

(H1) In an aspect, there is provided a vehicle comprising a system according to (G1), wherein the wireless devices are distributed throughout the vehicle.

The invention claimed is:

1. A system comprising:
a plurality of wireless devices comprising respective processors configured to pseudorandomly order a set of available channels of a wireless network into a first ordered set simultaneously, the first ordered set corresponding to a permutation of the set of available channels,
wherein the plurality of wireless devices comprises a first wireless device comprising a processor configured to:
generate, using the first ordered set, at least one subset of the set of available channels such that a first subset of the at least one subset comprises a first plurality of channels which are absent from other subsets of the set of available channels; and
allocate the first subset for use in communication by the first wireless device.

2. The system according to claim 1, wherein the respective processors of the plurality of wireless devices are configured to pseudorandomly order the set of available channels by pseudorandomly ordering the set of available channels based on a network time associated with the wireless network.

3. The system according to claim 1, wherein the respective processors of the plurality of wireless devices are configured to pseudorandomly order the set of available channels by pseudorandomly ordering the set of available channels based on a unique network identification of the wireless network.

4. The system according to claim 1, wherein the respective processors of the plurality of wireless devices are configured to pseudorandomly order the set of available channels every time a first predefined time period elapses.

5. The system according to claim 4, wherein a duration of the first predefined time period is greater than a duration of a time slot of the wireless network.

6. The system according to claim 1, wherein the respective processors are further configured to:
reorder the first ordered set by moving channels before a first point in the first ordered set to an end of the first ordered set, thereby forming a second ordered set, wherein the respective processors of the plurality of wireless devices are further configured to generate the at least one subset of the set of available channels based on the second ordered set.

7. The system according to claim 1, wherein a number of channels in the first plurality of channels is determined based on an importance of the first wireless device relative to other wireless devices of the wireless network.

8. The system according to claim 1, wherein the first wireless device comprises a transceiver and the processor is configured to:

determine that a first channel of the first plurality of channels is present in an allow list stored by the first wireless device; and transmit data to a second wireless device via the transceiver using the first channel of the first plurality of channels.

9. The system according to claim 8, wherein the processor is further configured to:

transmit, via the transceiver, a plurality of data packets to the second wireless device over a second predefined time period, wherein each of the plurality of data packets includes data defining the allow list; and in response to determining that the second predefined time period has elapsed, transmit, via the transceiver, the data to the second wireless device using the first channel of the first plurality of channels.

10. The system according to claim 9, wherein the first wireless device comprises:

one or more sensors configured to generate sensor data, wherein each of the plurality of data packets includes said sensor data.

11. The system according to claim 10, wherein the one or more sensors are vehicle sensors configured to sense attributes of a vehicle in which the one or more sensors are emplaced.

12. A system comprising:

a plurality of processors configured to:

generate random or pseudorandom subsets of a set of available channels of a wireless network such that each channel of the set of available channels is present in no more than one of the subsets and at least one of the subsets comprises a first plurality of channels;

determine that a first channel of the first plurality of channels is present in an allow list including one or more channels preferred for use in communication; and transmit or receive data using the first channel of the first plurality of channels, wherein at least one processor of the plurality of processors is configured to randomly or pseudo-randomly order the set of available channels every time a first predefined time period elapses.

13. The system according to claim 12, wherein a duration of the first predefined time period is greater than the duration of a time slot of the wireless network, optionally wherein duration of the first predefined time period is equal to a length of a slotframe of the wireless network.

14. The system according to claim 12, wherein said data includes sensor data.

15. A system comprising
a first wireless device; and
a second wireless device;
the first wireless device comprising:

a transceiver; and one or more processors configured to, transmit, via the transceiver, a plurality of data packets to the second wireless device over a predefined time period, wherein each packet of the plurality of data packets includes data defining an allow list including one or more channels preferred for use in communication;

determine that the predefined time period has elapsed; and in response to determining that the predefined time period has elapsed, communicate with the second wireless device via the transceiver using a channel selected from the one or more channels, wherein the first wireless device comprises one or more sensors configured to generate sensor data, wherein each packet of the plurality of data packets includes said sensor data.

16. The system according to claim 15, wherein the one or more sensors are vehicle sensors configured to sense attributes of a vehicle in which the one or more sensors are emplaced.

17. A system comprising:

a network manager device comprising a first processor; and a plurality of wireless devices comprising a first wireless device, wherein the first wireless device comprises a second processor, wherein the first processor is configured to randomly order a set of available channels of a wireless network into a first ordered set corresponding to a permutation of the set of available channels, and to transmit the first ordered set to the first wireless device, and wherein the second processor is configured to:

generate at least one subset of the set of available channels such that a first subset of the at least one subset comprises a first plurality of channels which are absent from other subsets of the set of available channels, and allocate the first subset for use in communication by the first wireless device.

18. The system according to claim 17, wherein the first processor is configured to randomly order the set of available channels every time a first predefined time period elapses.

19. The system according to claim 18, wherein a duration of the first predefined time period is greater than a duration of a time slot of the wireless network.

20. The system according to claim 17, wherein the first wireless device of the plurality of wireless devices comprises a transceiver, and wherein the second processor is configured to transmit data to a second wireless device of the plurality of wireless devices via the transceiver using a first channel of the first plurality of channels.

* * * * *